United States Patent

[11] 3,629,730

[72] Inventors Hans-Joerg Penzel; Hermann Kadow, both of Munich, Germany

[21] Appl. No. 21,770
[22] Filed Mar. 23, 1970
[45] Patented Dec. 21, 1971

[73] Assignee Siemens Aktiengesellschaft Berlin and Munich, Germany

[32] Priority Apr. 15, 1969
[33] Germany
[31] P 19 19 110.7

[54] CAPACITOR ARRANGEMENT FOR WAVE CONDUCTOR SYSTEMS
2 Claims, 3 Drawing Figs.

[52] U.S. Cl. ........ 333/1, 333/24 C, 333/84 M, 317/101 R
[51] Int. Cl. ........ H01p 3/02, H03h 7/48
[50] Field of Search ........ 333/1, 6, 7, 8, 24, 84; 317/101; 174/36

[56] References Cited

UNITED STATES PATENTS

| | | | |
|---|---|---|---|
| 3,155,881 | 11/1964 | St. Jean | 333/1 X |
| 3,162,717 | 12/1964 | Lentz | 174/36 |
| 3,176,275 | 3/1965 | Gribble et al. | 333/24 X |
| 3,321,717 | 5/1967 | Harper | 333/7 |
| 3,337,820 | 8/1967 | Harper | 333/7 |
| 3,351,702 | 11/1967 | Stephens | 333/84 X |
| 3,351,816 | 11/1967 | Sear et al. | 317/101 |
| 3,519,959 | 7/1970 | Bewley et al. | 333/84 X |

*Primary Examiner*—Herman Karl Saalbach
*Assistant Examiner*—Marvin Nussbaum
*Attorney*—Hill, Sherman, Meroni, Gross & Simpson

ABSTRACT: A matrix storer having magnetic storage elements arranged in rows and columns and constructed as wave conductors. The wave conductors are disposed substantially parallel to a base conductor which serves as a common return line for pulses conducted along the drive or reading lines of the storer. A further conducting plane is spaced from the base plane and separated therefrom by a thin insulating layer to form a capacitor which couples the potential of the drive or reading lines to the base plane. Additional layers of conducting planes can be provided to form an additional capacitor for high-frequency coupling to the base plane. The additional conductors are insulated from each other and from the conductors forming the first capacitance, and a plurality of connectors are distributed throughout the surface of the capacitor to directly couple one of the conducting plates forming the second capacitor to the base plane.

INVENTORS
Hans-Joerg Penzel
Hermann Kadow

BY Hill, Sherman, Meroni, Gross & Simpson ATTYS.

CAPACITOR ARRANGEMENT FOR WAVE CONDUCTOR SYSTEMS

BACKGROUND OF THE INVENTION

Field of the Invention

The field of art to which this invention pertains is matrix storers with magnetic storage elements having drive or reading lines arranged in rows and columns and constructed as wave conductors. In particular, this invention relates to means for coupling points at different fixed potentials with a low impedance path at high frequencies.

SUMMARY OF THE INVENTION

It is an important feature of the present invention to provide an improved capacitor coupling arrangement for pulse operation of wave conductor systems.

It is another feature of the present invention to provide a magnetic storer having wave conductors arranged substantially parallel to a base conducting plane wherein the base conducting plane forms one of the plates of a capacitor for coupling the potential of the wave conductors to the potential of the base conducting plane.

It is another object of the present invention to provide a magnetic storage device for pulse operation in a wave conductor system wherein a layer capacitor is formed to couple the wave conductors to a base conducting plane and wherein the capacitor is formed by two conducting planes separated by a relatively thin insulating layer and disposed substantially parallel to the wave conductors.

It is also an object of the present invention to provide a capacitor as described above wherein a further pair of conducting planes are disposed in parallel relation to the base conducting plane and separated from each other and from the base conducting plane by a series of relatively thin insulating layers and wherein one of a second pair of conducting planes is coupled through the layer capacitor to the base conducting plane.

It is an additional object of the present invention to provide a layer capacitor of the type described above wherein a plurality of contacting members are distributed throughout the layer capacitor to couple spaced-apart conducting layers of the capacitor without electrically coupling intermediate layers.

It is a further object of this invention to provide a layer type capacitor for a magnetic storer as described above wherein the spacing between the plurality of contacting members is in the order of one centimeter.

These and other objects, features and advantages of the invention will be readily apparent from the following description of a preferred embodiment thereof, taken in conjunction with the accompanying drawing, although variations and modifications may be effected without departing from the spirit and scope of the novel concepts of the disclosure.

DESCRIPTION OF THE PREFERRED EMBODIMENT

The present invention relates to matrix storers with magnetic storage elements and with drive and reading lines arranged in rows and columns and constructed as wave conductors.

Constructing the drive and reading lines of matrix storers in the form of wave conductors having a definite wave resistance and terminating resistance for the purpose of avoiding undesirable reflections is well known in the art. To accomplish this, a conducting plate which may be referred to as a base plane is arranged substantially parallel to the matrix. The base plane serves as a common return line for pulses carried by the matrix. The transmission resistance is determined by the geometric dimensions of the wave conductors, their position with respect to the base plane and with respect to adjacent conductors.

In many cases, it is not possible to connect terminating resistors or pulse generators directly by a DC connection to the common return line or the base plane since the DC potentials of the matrix lines may be different from the potential of the base plane. Accordingly, the matrix lines must be connected to the base plane through a capacitor arrangement.

Figure 1:
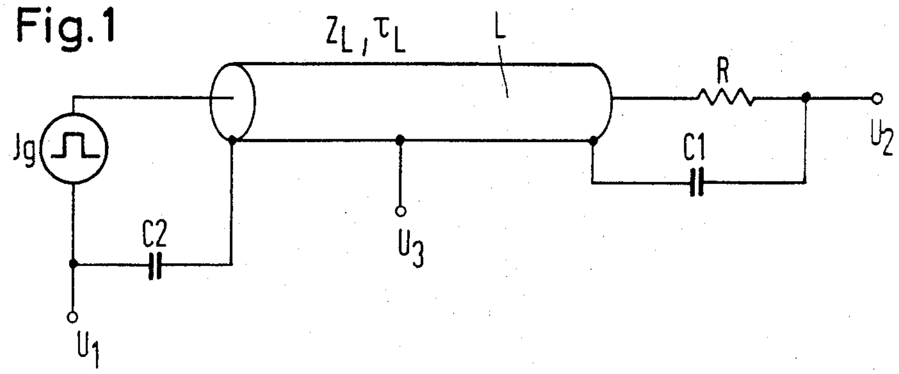
FIG. 1 is a schematic of a magnetic storer according to the present invention illustrating the arrangement of the wave conductors in the form of a coaxial line for simplicity and further illustrating the arrangement of the capacitors which are required in a storer arrangement according to the present invention.

FIG. 1 shows a simplified form of a wave conductor and capacitor coupling arrangement for a matrix storer. Here, for simplicity, the wave conductor is indicated generally as a coaxial line L in which the inner conductor may be referred to as the wave conductor. This may be a drive line. A pulse source $I_o$ is provided and can be either an active source or a passive source such as a switch. A terminating resistor R is shown coupled to the inner conductor or the wave conductor.

Various connecting points are identified as $U_1$, $U_2$, and $U_3$. Each of these points may have a different potential applied thereto. Capacitors $C_1$ and $C_2$ are provided for the high frequency coupling of the pulse source and the terminating resistor R to the return line L.

The values of these capacitors are determined by the duration of the pulses to be transmitted and by the wave resistance of the device. It is known that the capacitive time constant should be in the order of five to 10 times the duration of the pulse, and the result is that large capacitances in the order of magnitude of microfarads are required. Another requirement is that the capacitors must be suited to provide steep pulse flanks. This means they must be low in attenuation and, above all, low in inductance. Normally, this requirement is difficult and practically impossible to fulfill for reasons of production technology. Furthermore, capacitors such as may be provided cannot be accommodated with sufficiently short connecting lines as represented by the device shown in the drawings. Accordingly, it is desirable to accomplish the separate functions required by separate capacitors for the pulse flank and the pulse duration features. The present invention provides capacitances which accomplish the steep pulse flanks required in an arrangement having several parallel wave conductors with a DC potential which is different from the potential of a base plane which is positioned substantially parallel to the wave conductors.

The present invention accomplishes this result by providing a common capacitor for the high frequency coupling of the various potentials of a storer system where the capacitor is formed by two conducting layers and a thin insulating interlayer of a multilayer device. In the arrangement according to the present invention, the layer adjacent to the wave conducting matrix forms the base plane referred to above.

Figure 2:
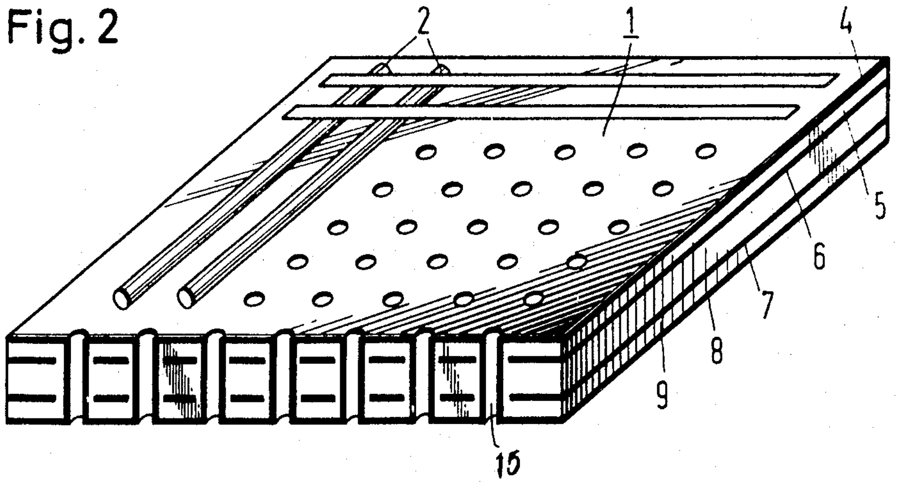
FIG. 2 is a partial section view of a multilayer capacitor arrangement according to the present invention showing the parallel positioning of wave conductors adjacent to the surface of the base plane of the capacitor.

In FIG. 2 a matrix device according to the present invention is shown in relation to a multilayer capacitor which performs the desirable functions described above.

In the interest of simplicity, only a few conductors 2 and 3 are shown in the drawing. A conducting layer 4 is positioned adjacent to the storer lines 3 and is the high frequency reference surface or base plane referred to above. A thin insulating interlayer 5 which may be formed of a glass fiber reinforced epoxide is positioned immediately adjacent the base plane 4. A further conducting layer is provided adjacent the insulating layer 5, and the layers 4 and 6 form the plates of a capacitor which functions as a "flank capacitor" for the wave conductor system.

The ends of the terminating resistors which are not connected to the wave conductors, are connected by the shortest path to the conducting layer 6 of the capacitor so that the "-flank capacitor" is at least equally effective for each of the wave conductors and, has the least possible feed inductance.

An additional "flank capacitor" may be necessary, for example, for a section of a wave conductor system running perpendicular to the first and being at a further different potential.

In FIG. 2 there is shown a second pair of conducting layers 7 and 8 with an insulating interlayer 9. These three layers form a second "flank capacitor."

Because of the geometry of the device, neither of the two plates of this second capacitor can assume the role of the high frequency reference surface or base plane 4. Therefore, to assure that this capacitor will function equally as well as the capacitor 4–5, the plate 8 is connected to the base plane 4 by means of a plurality of contacts 15 which extend through the multilayer device as shown in FIG. 2. These contacts are distributed throughout the entire area of the multilayer device, and if the distance between the contacts is not substantial and is held in the order of one centimeter, it has been found that there is no impairment of the capacitor properties of the capacitor formed by the plates 7 and 8. The contacts 15 couple the conducting plates 4 and 9 without contacting the intermediate plates 6 and 7 as can be readily seen in the cross section of the multilayer device illustrated in FIG. 2.

Additional "flank capacitors" can be formed by adding further pairs of conducting layers separated by thin insulating layers and further increasing the width or thickness of the multilayer capacitor as shown in FIG. 2 in such an arrangement, one layer of each additional capacitor would be connected to the base plane as shown.

Figure 3:
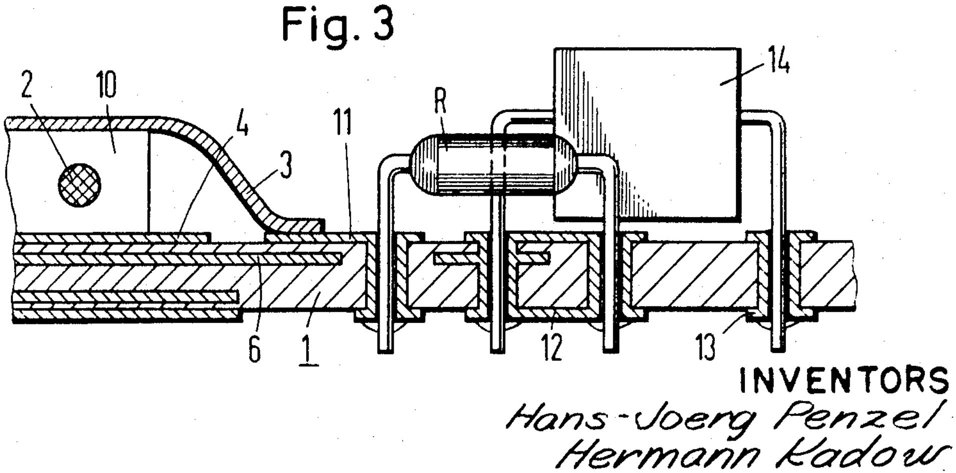
FIG. 3 is a detailed sectional view of a multilayer capacitor and wave conductor arrangement similar to that shown in FIG. 2 illustrating the positioning of the wave conductors and the various plates forming the multilayer capacitor according to the present invention.

It is also possible, for specific requirements, to subdivide the capacitor as shown in FIG. 2 perpendicularly to the plane of the wave conductors 2 and 3 and therefore form two capacitors with correspondingly reduced capacitance in the same plane. In FIG. 3, a section is shown through a capacitor arrangement of a magnetic wire storer such as illustrated in FIG. 2. The conductors 2 and 3 are arranged parallel to the device 1. The conducting layer 4 is the base plane of the wave conductor system and is also the first plate of the first "flank capacitor." The second plate of the first capacitor is identified by the numeral 6.

The ends of the conductors 3 are connected to contacts 11 which also are coupled to the terminating resistor R. The other end of the resistor R is connected to the contacts 12 which in turn may be coupled to the plate 6 of the first capacitor.

An additional capacitor 14 which is an "impulse duration capacitor" is likewise provided between the contacts 12 and the contact 13 which may be coupled to the base plane through the capacitor formed by the plates 4 and 6.

The arrangement of the multilayer conducting plates according to the present invention does not require additional expense. In particular, in the case of magnetic wire storers, it is generally the practice to place the drive conductors and the reading means entirely or partially together with the storage device on a common carrier plate such as the plate 1 in FIG. 3. Therefore, the use of a multilayer conducting plate arrangement as provided by the present invention is feasible and economical.

I claim:

1. A capacitor arrangement for wave conductor systems comprising:
- a base conducting plane and a plurality of wave conductors disposed substantially parallel to the base conducting plane,
- a relatively thin insulating layer disposed against said base conducting plane,
- a further conducting layer disposed against said insulating layer oppositely of said base conducting plane and forming a capacitor therewith, and
- said capacitor being connected to couple the potential of said base conducting plane to the potential of said plurality of wave conductors,
- a pair of additional conducting layers being provided and insulated from each other and from said further conducting layer, one of said pair of additional conducting layers being direct coupled to said base conducting plane,
- A plurality of through coupling members being distributed throughout the surface of said conducting plane to couple said base plane to said one of said additional conducting layers without coupling said base plane to intermediate conducting layers disposed between the base plane and said one additional conducting layer.

2. A capacitor arrangement for wave conductor systems in accordance with claim 1 wherein the distance between adjacent areas of said through coupling members is in the order of one centimeter.

* * * * *